April 23, 1968     N. E. SINDLINGER     3,379,058
FORCE GAUGE

Filed Oct. 21, 1965     4 Sheets-Sheet 1

INVENTOR
NORMAN E. SINDLINGER
BY
ATTORNEYS

INVENTOR
NORMAN E. SINDLINGER
BY
ATTORNEYS

April 23, 1968  N. E. SINDLINGER  3,379,058
FORCE GAUGE

Filed Oct. 21, 1965  4 Sheets-Sheet 3

INVENTOR
NORMAN E. SINDLINGER
BY

ATTORNEYS

April 23, 1968  N. E. SINDLINGER  3,379,058
FORCE GAUGE

Filed Oct. 21, 1965  4 Sheets-Sheet 4

INVENTOR
NORMAN E. SINDLINGER
BY
Busser Smith & Hardy
ATTORNEYS

United States Patent Office 3,379,058
Patented Apr. 23, 1968

3,379,058
FORCE GAUGE
Norman E. Sindlinger, Medford Lakes, N.J., assignor to Ametek, Inc., New York, N.Y., a corporation of Delaware
Filed Oct. 21, 1965, Ser. No. 499,284
6 Claims. (Cl. 73—141)

ABSTRACT OF THE DISCLOSURE

A force gauge has a frame to which one end of a cantilever beam is secured and a load transmitting member connected to the beam. A dial indicator having a frame, a pinion, an indicator needle connected to the pinion and a sector gear engaging the pinion is connected to the beam by a link pivotally connected to the sector gear and to the beam. A lever supports the frame of the dial indicator and is mounted on the force gauge frame to pivot about a point adjacent the point where the beam is secured to the force gauge frame. The force gauge frame, the beam, the link, the pivotal member and the dial indicator form a four bar linkage system. Cam means are provided for moving the pivotable member to initially position the needle of the dial indicator.

---

This invention relates to a compact force gauge of the push-pull type.

The problem of producing an inexpensive and accurate hand held force gauge has existed for many years. While accurate hand-held force gauges are available, they are of expensive construction and somewhat large.

It is, therefore, an object of this invention to provide an accurate, small and a relatively inexpensive force gauge.

It is a further object of this invention to provide a novel means for zero adjusting a hand held force gauge in a manner more accurate than when the conventional springs are used.

It is a further object of the invention to provide a force gauge which is adjustable to provide an extended range for push or pull operation.

The invention will be fully understood on reading the following description in conjunction with the drawings in which.

Figure 1:
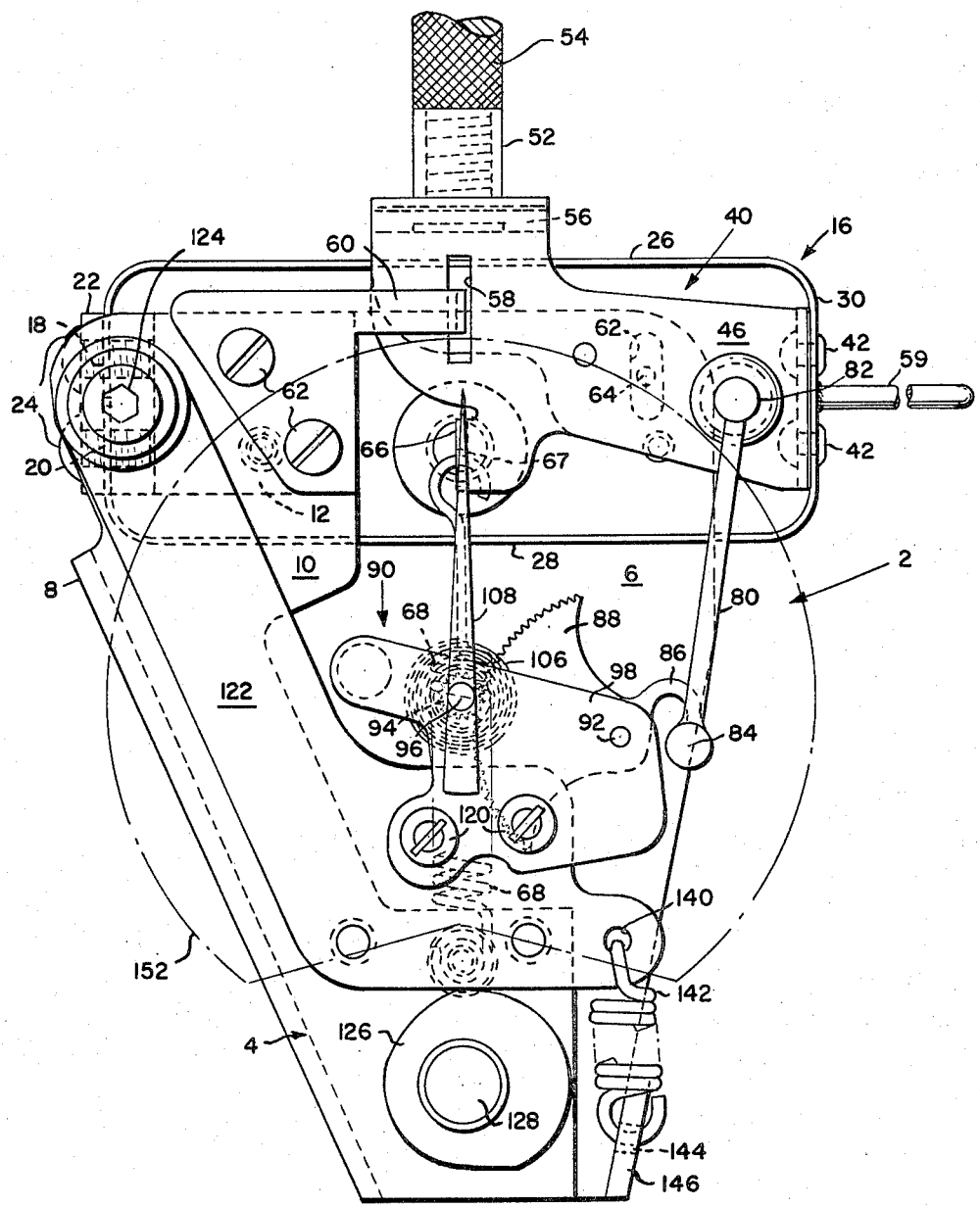
FIGURE 1 is a front elevation of a force gauge mechanism in accordance with the invention.
Figure 2:
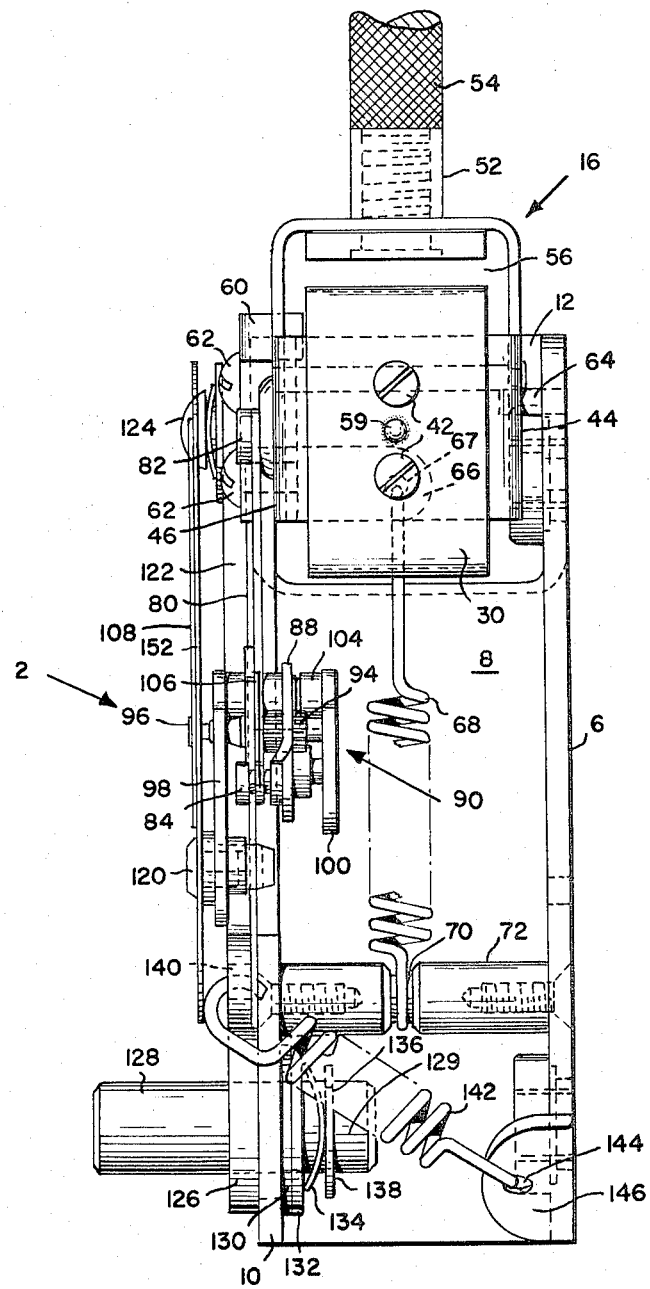
FIGURE 2 is a side elevation of the force gauge mechanism of FIGURE 1.
Figure 3:
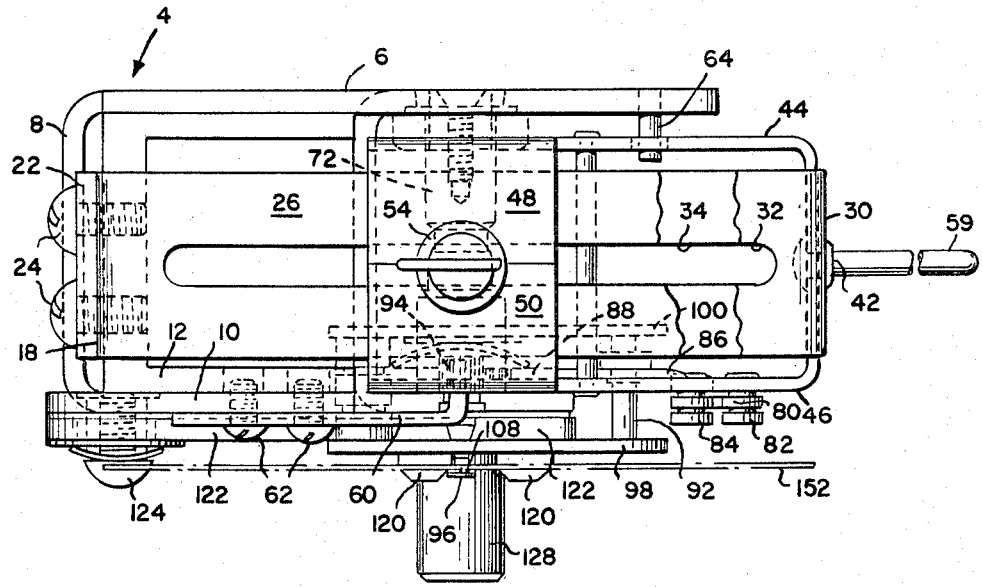
FIGURE 3 is a top plan view of the force gauge mechanism of FIGURE 1.

Referring first to FIGURES 1–3, a force gauge 2 in accordance with the invention has a frame 4 comprising a bottom panel 6, a side panel 8, a top panel 10 and a U-shaped member 12 secured between bottom panel 6 and top panel 10.

A double cantilever spring beam 16, of, for example, spring steel, is provided with right angled end portions 18 and 20 which are secured to U-shaped portion 12 of frame 4 by an overlying plate 22 and machine screws 24 passing through plate 22 and end portions 18 and 20 and into U-shaped portion 12. The double beam 16 has an upper cantilever portion 26 and a lower cantilever portion 28 joined by an end portion 30 which is secured to a U-shaped transmitting member 40 by rivets 42. Portions 26 and 28 are slotted respectively as indicated at 32 and 34. Member 40 has spaced substantially parallel sides 44 and 46 having flange portions 48 and 50 respectively which overlie the center of cantilever portion 26 and are secured to stiffening plate 56, for example, by welding. A threaded female adapter 52 is secured to flange portions 48 and 50 as by welding. A hook member 54 is threadably secured to adapter 52. A slide probe 59 for use where access is limited is brazed to beam 16. Accurate results are achieved with the side probe since the beam tends to maintain its parallel motion.

Side 46 of member 40 is provided with a slot 58 which receives a right angled stop member 60 secured to top panel 10 of frame 4 by machine screws 62. Side 44 of member 40 is provided with a slot 62 for the reception of a stop pin 64 secured to bottom panel 6 of frame 4. These stop systems limit the travel of beam 16 and being on opposite sides prevent any overturning of the beam at the extremes of operation which would impose an undesirable overload on the beam. An ear 66 has an opening 67 engaged by one end of extension coil spring 68, the other end of which engages a peripheral groove 70 in a post 72 mounted between bottom panel 6 and top panel 10. Spring 68 is a calibration spring selected to make the final gradient adjustment by the manufacturer.

A link 80 is pivotally connected to side 46 of member 40 as indicated at 82, and pivotally connected as indicated at 84 to arm 86 of sector gear 88 of dial indicator 90. Sector gear 88 is pivotally mounted as indicated at 92 and meshed with a pinion 94 secured to a shaft 96 which in turn is mounted for rotation in plates 98 and 100. Post 104 is secured between the plates 98 and 100. A spiral spring 106 has one end secured to shaft 96 and the other end secured to post 104 and is pre-wound to bias dial indicator needle 108 secured to shaft 96 counterclockwise as viewed in FIGURE 1. The dial indicator 90 is conventional per se.

Plate 98 of dial indicator 90 is secured by rivets 120 to lever 122 which is mounted on frame 4 for rotation as indicated at 124 on an axis lying midway between the planes of portions 26 and 28 of beam 16 and adjacent portions 18 and 20 and substantially at the effective center of rotation of the pivot point 82. Lever 122 may equally well be a flexure member having the same effective pivot point. Lever 122, frame 4, beam 16, link 80 and sector gear 88 form a four bar linkage system. A cam 126 for positioning lever 122 has a handle portion 128 and a shank portion 129 passing downwardly through top panel 10 of frame 4, through a bushing member 130, a washer 132, a spring washer 134 and is provided with a peripheral groove 136 engaged by a lock washer 138. Lever 122 is provided with an opening 140 engaged by one end of an extension coil spring 142, the other end of which engages an opening 144 in ear 146 struck up from bottom panel 6.

Figure 7:
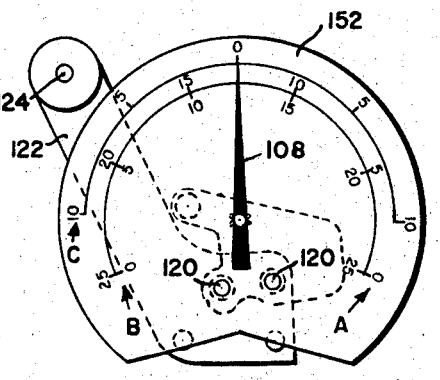
FIGURE 7 is a front elevation of an indicator dial for use with the force gauge of FIGURE 4.

A suitable indicator dial 152 is secured to plate 98 of dial indicator 90 by means of the rivets 120 employed to secure plate 98 to lever 122. As seen in FIGURE 7, dial 152 is provided with a scale indicated at A having its zero point at the right-hand lower portion of scale 152 and running counterclockwise, a scale indicated at B having its zero point at the lower left-hand portion of scale 152 and running clockwise, and a third scale indicated at C running both clockwise and counterclockwise from a central zero point.

Typically, the above described mechanism is enclosed in a conventional casing secured to frame 4 which is not shown for the sake of clarity.

*Operation*

Figure 4:
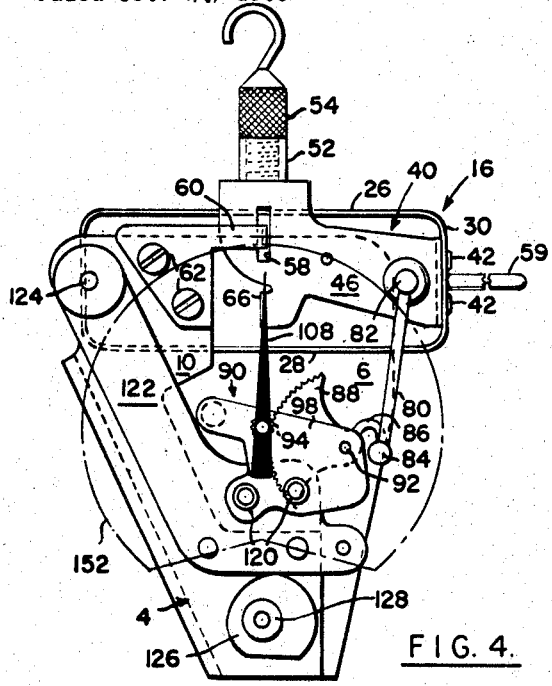
FIGURE 4 is a front elevation of the force gauge mechanism of FIGURE 1 with a dial added in phantom showing the indicator needle in the central zero position.

As will be described, the force gauge can be set to function immediately as a push-pull gauge or as an extended range push gauge or as an extended range pull gauge. The operation can best be discussed with reference to FIGURES 4 through 7. Assuming the parts of the gauge to be as shown in FIGURE 4 the dial indicator needle 108 secured to shaft 96 of dial indicator 90 is in the zero position for push-pull operation, that is, the position shown in FIGURE 7. If hook 54 is moved relatively away from spring beam 16 by a force to be measured against the resistance offered by spring beam 16, link 80 is moved causing sector gear 88 to pivot counterclockwise about the point 92 causing the clockwise rotation of pinion 94, shaft 96 and indicator needle 108 so that needle 108 will indicate the force on scale C of dial 152. In a pushing operation either employing the outer end of hook 54 or a typical pushing fitting (not shown), it will be evident that the above described operation will be reversed with needle 108 being moved counterclockwise over scale C of dial 152 to indicate the force being exerted.

Figure 5:
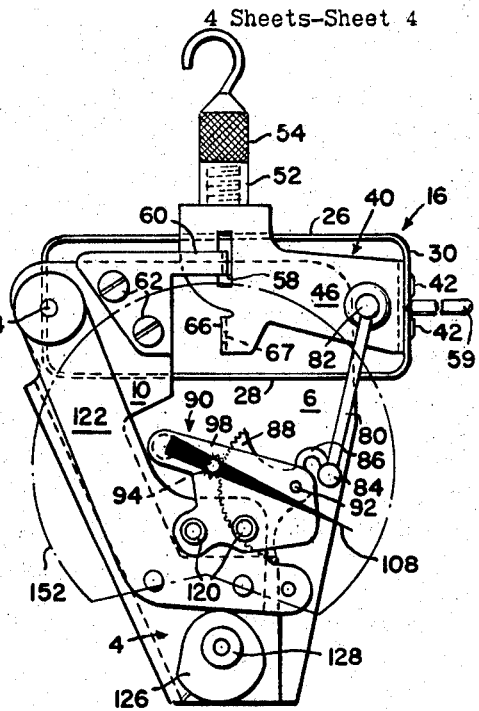
FIGURE 5 is a front elevation of the force gauge mechanism of FIGURE 4 showing the indicator needle in the zero position for maximum measurement of "push"

Referring now to FIGURE 5, force gauge 2 has been adjusted to operate for a maximum range of "push." This was accomplished by the movement of cam 126 to the position shown in FIGURE 5 causing the clockwise movement of lever 122 under the influence of spring 142, the counerclockwise movement of pivot 92 about pivot 84 causing counterclockwise rotation of sector gear 88 and a consequent clockwise rotation of pinion 94, shaft 96 and indicator needle 108 to position the needle 108 over the zero of scale A, approximately 115°. On "push" operation indicator needle 108 can be moved the full arc of scale A and somewhat beyond, that is, about 240°. Thus the range of "push" operation is doubled.

Figure 6:
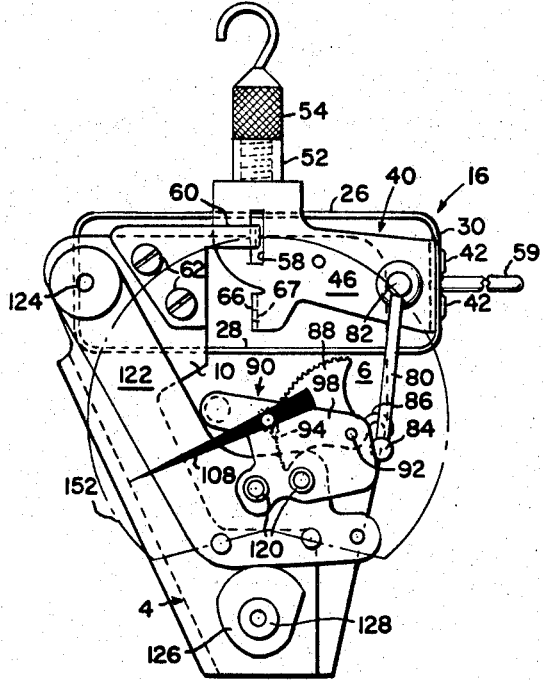
FIGURE 6 is a front elevation of the force gauge mechanism of FIGURE 4 with the indicator needle in the zero position for maximum measurement of "pull"

Similarly, when cam 126 is turned to the position shown in FIGURE 6 indicator needle 108 is moved counterclockwise to the zero position on scale B to double the range of "pull" operation.

In the above discussion of the adjustment of force gauge 2 for maximum "push" or maximum "pull" operation, it will be seen that cam 126 can be employed to zero adjust needle 108 to the zero position of any of scales A, B, or C of dial 152. This is particularly advantageous with respect to scale C employed for immediate push or pull operation wherein maximum accuracy is achieved.

The linkage arrangement of force gauge 2 is at its optimum with respect to accuracy when the sector gear 88 and link 80 are in the position shown in FIGURE 4. Should a zero adjustment be necessary due to the displacement of the spring beam 16 for example, due to its being held in a position such that the weight of an attachment such as hook 14 displaces the spring beam 16 which in turn causes indicator needle 108 to move off the zero position of scale C, then bringing the needle back to the zero position through the movement of cam 126 will return sector gear 88 and link 80 to almost exactly the relative position in which they are found in FIGURE 4. This maximizes the accuracy of the force gauge particularly where relatively small forces are being measured.

Stop pin 64 coacts with slot 62 to limit the travel of member 40 so as to prevent the disengagement of sector gear 88 from pinion 94. The arrangement is such that the beam 16 can be displaced in either direction from the position shown in FIGURE 4 in an amount to produce a movement of about 240° of indicator needle 108.

It is to be understood that the above description is by way of illustration and is not intended to be limiting.

In addition to the advantages discussed above, the gauge of the invention is advantageous due to the absence of bearings in the force transducing system and the low mass of the suspended portion of the system. The gauge is rugged and compact and is of low manufacturing cost. Further, it is very accurate since the only significant error is due to hysteresis and this error is small.

What is claimed is:

1. A force gauge comprising:
   a first frame,
   a cantilever spring beam having one end thereof secured to the frame,
   means to transmit a load to the beam,
   a dial indicator including a second frame, a pinion, an indicator needle connected to the pinion and a sector gear engaging the pinion,
   a link pivotally connected to the sector gear and pivotally connected to the beam at a point remote from the said one end of the beam,
   a pivotable member supporting the second frame of the dial indicator and mounted on the first frame to pivot about a point adjacent the said one end of the beam,
   said first frame, beam, link, pivotable member and dial indicator forming a four bar linkage system,
   and means for moving said pivotable member about its pivot to initially position the needle of the dial indicator.

2. A force gauge in accordance with claim 1 in which the means to move the pivotable member about its pivot comprises a cam.

3. A force gauge in accordance with claim 1 in which the means to transmit a load to the beam has one end thereof secured to the other end of the beam and the other end thereof extending at least to a perpendicular to the unloaded beam passing substantially through the cantilever mid-point.

4. A force gauge in accodrance with claim 3 in which the means to transmit a load to the beam includes a load bearing member connected to the other end of the beam and extending in a direction away from the beam.

5. A force gauge in accordance with claim 1 in which the means to move the lever about its pivot comprises a cam and the means to transmit a load to the beam has one end thereof secured to the other end of the beam and the other end thereof extending at least to a perpendicular to the unloaded beam passing substantially through the cantilever mid-point.

6. A force gauge in accordance with claim 1 in which the cantilever spring beam is a double beam having a pair of cantilever portions.

References Cited

UNITED STATES PATENTS 2,382,289  8/1945  Burt.
2,683,985  7/1954  Smulski _____ 177—229
2,861,790  11/1958  Stevens.

RICHARD C. QUEISSER, *Primary Examiner.*

JOHN R. FLANAGAN, *Assistant Examiner.*